United States Patent [19]
Mahony

[11] 4,408,228
[45] Oct. 4, 1983

[54] METHOD AND MEANS FOR REDUCING NOISE IN TELEVISION DISPLAY SYSTEM

[75] Inventor: John E. Mahony, Sacramento, Calif.

[73] Assignee: General Electric Company, Rancho Cordova, Calif.

[21] Appl. No.: 203,658

[22] Filed: Nov. 2, 1980

[51] Int. Cl.³ .................. H04N 5/21; H04N 5/30; G01N 29/00; H04N 5/02
[52] U.S. Cl. .................... 358/167; 358/112; 358/140; 128/660; 73/620
[58] Field of Search ............... 358/167, 112, 140, 138, 358/134, 340, 336, 105, 160, 148; 73/618, 620; 128/660

[56] References Cited

U.S. PATENT DOCUMENTS

| 3,651,253 | 3/1972 | Morgand et al. | 358/112 |
| 4,064,530 | 12/1977 | Kaiser et al. | 358/167 |
| 4,212,072 | 7/1980 | Huelsman | 358/112 |

OTHER PUBLICATIONS

Abbott and Thurstone, "Multi-Scan Processing in a Phased Array Imaging System", *IEEE* 1978 *Ultrasonics Symposium Proceedings*, pp. 220–224, Sep. 25–27, 1978.
Thurstone and Abbott, "Actual Time Scan Conversion and Image Processing in a Phased Array Ultrasound Imaging System", *IEEE* 1977 *Ultrasonics Symposium Proceedings*, pp. 247–249.

*Primary Examiner*—John C. Martin
*Attorney, Agent, or Firm*—Flehr, Hohbach, Test, Albritton & Herbert

[57] ABSTRACT

Noise is reduced in the television display of an A trace in an ultrasonic scanner system by integrating digital data representing the magnitude of video signals corresponding to the echos of ultrasonic pulses. The digital integration is accomplished on a point by point basis by summing digital data with stored digital data from previous video signals. Preferably, a capture memory is utilized with a digital summer for integrating the data while another memory periodically receives the integrated data and functions to refresh the television display. In another embodiment, two memories can alternate in capturing the integrated data and in refreshing the display.

1 Claim, 5 Drawing Figures

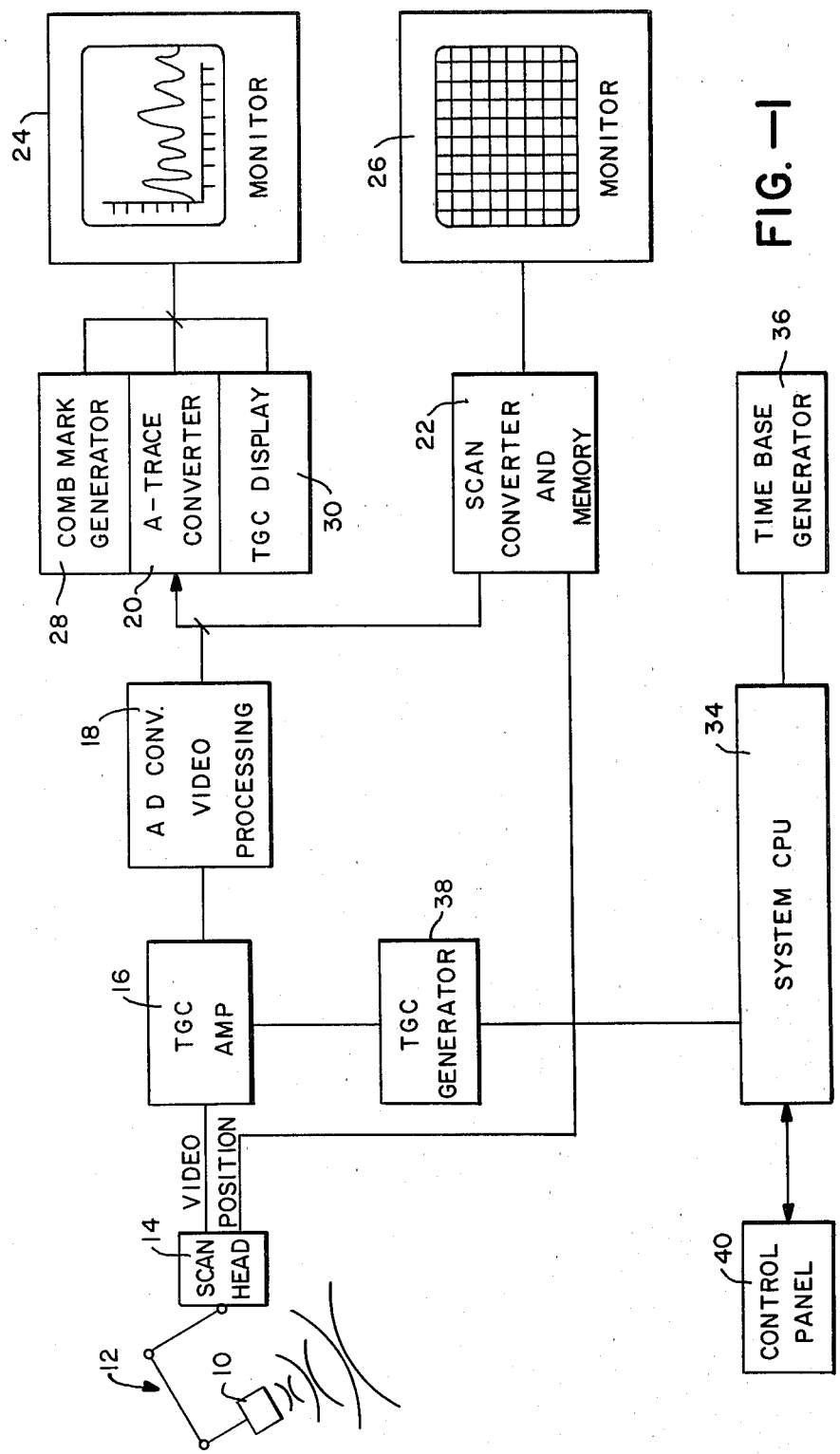
FIG.—1

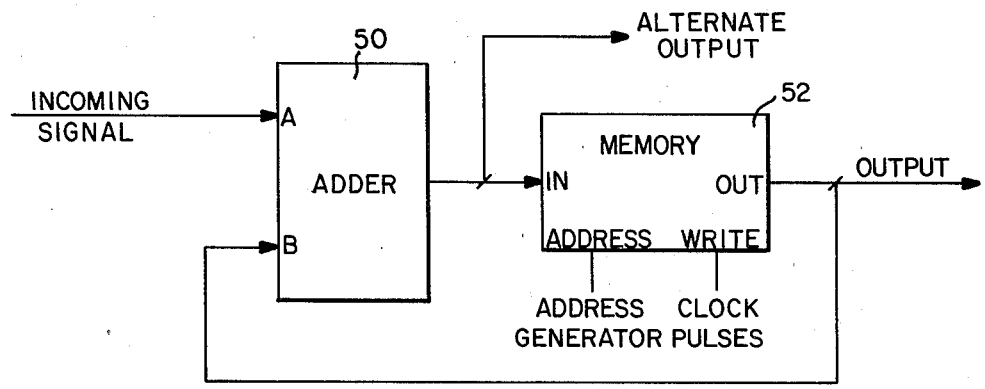
FIG.—2
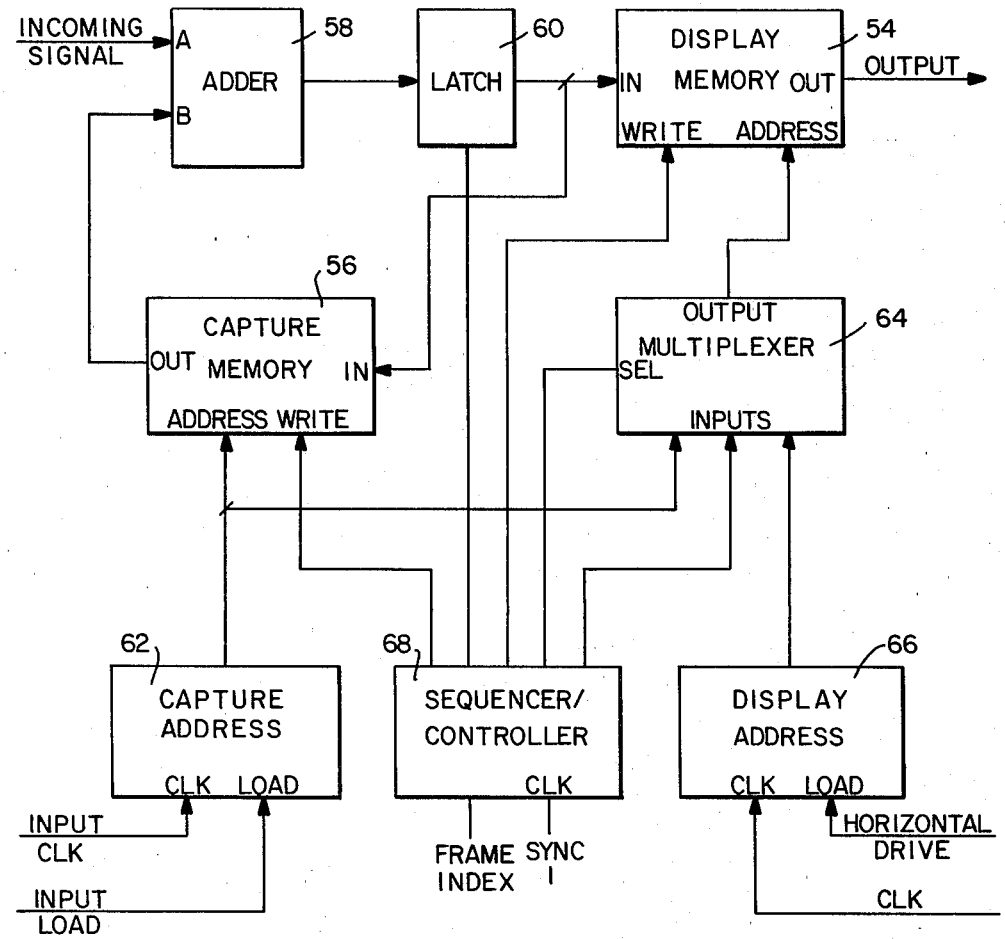
FIG.—3

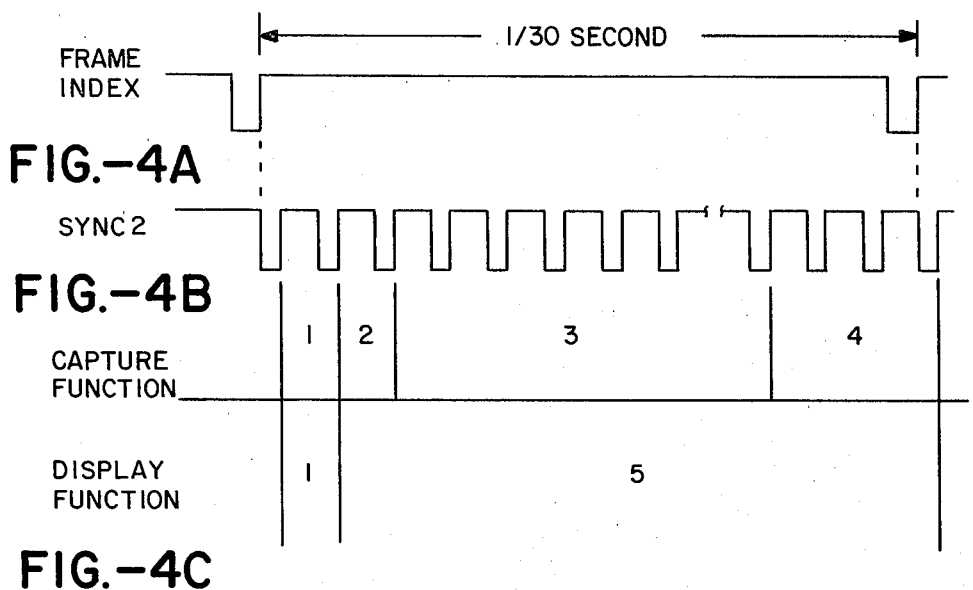
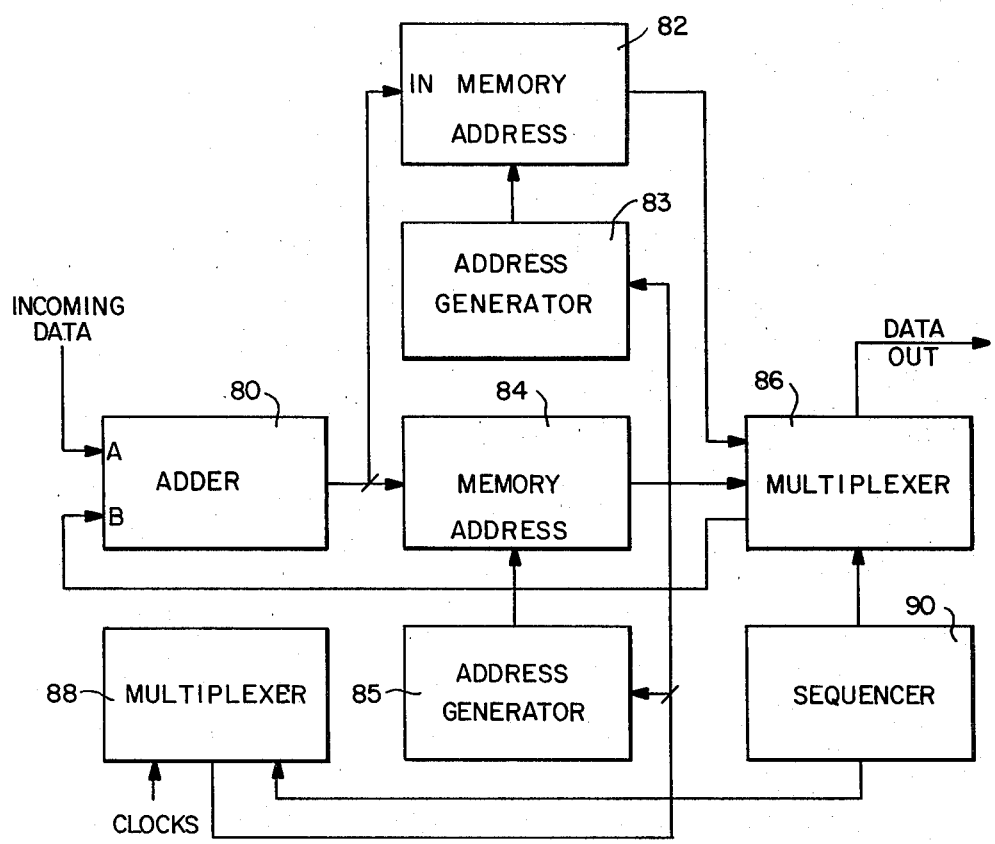

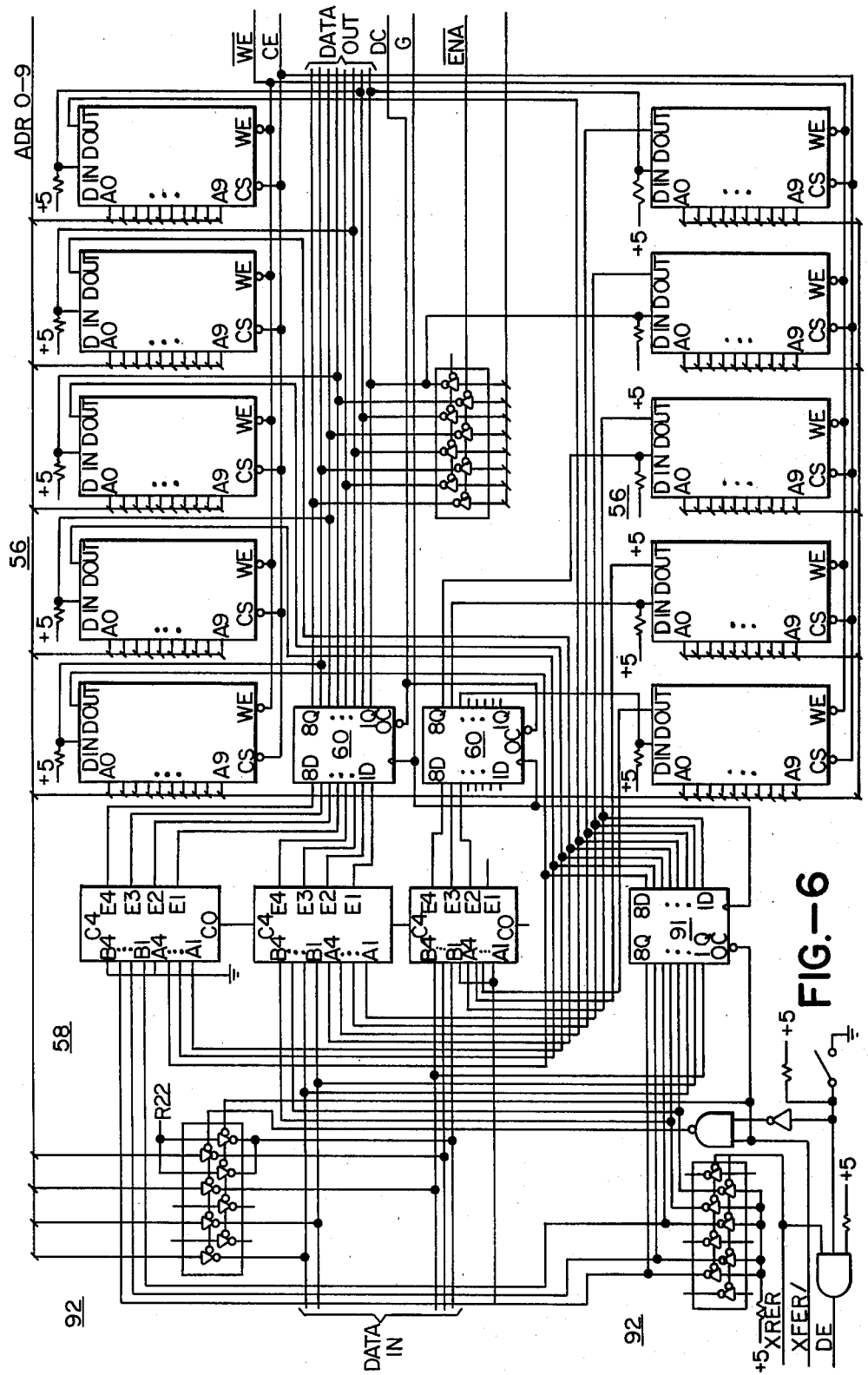

METHOD AND MEANS FOR REDUCING NOISE IN TELEVISION DISPLAY SYSTEM

This invention relates generally to television displays such as used in ultrasonic scanners, and more particularly the invention relates to a method and means for reducing noise in a television display.

Ultrasonic scanning systems are known and commercially available for medical diagnostic purposes. See for example U.S. Pat. No. 4,172,386 for "Video A Trace Display System for Ultrasonic Diagnostic System" and U.S. Pat. No. 4,204,433 for "Computerized Ultrasonic Scanner With Technique Select". The commercially available Datason ultrasonic system of General Electric Company provides an A trace display along with both real time and static images on a television display.

Briefly, such systems utilize sound transducers to transmit ultrasonic (e.g. on the order of several megahertz) waves into a patient and to receive echo signals. In one mode of operation, the transducer is attached to a plurality of hinged arms for movement in a single plane, and potentiometers associated with the hinged arms produce signals which identify the transducer in position. Alternatively, a hand held transducer or a linear transducer array can be employed. The echo signals are applied to a variable gain amplifier to adjust the echo signals for attenuation when passing through the patient. The adjusted signals are then passed through an analog to digital conversion and video processing circuitry and thence either to standard converter circuitry for controlling the body scan display or to A trace conversion circuitry for graphically depicting the ultrasonic pulse echo. The echo amplitude is typically graphically represented as the ordinate value, while the echo return time (indiciative of body depth) is reproduced on the abscissa. Accordingly, by viewing the A trace one may determine the depth into the body of each discontinuity in the pulse propagation path and the type of media transition.

An X-Y oscilloscope can be used for displaying the A trace, and use of an oscilloscope offers advantages in displaying complex waveforms. In particular, an oscilloscope has the ability to integrate information contained in many repetitive echo signals. The data is continually displayed on the screen as the electron beam continuously scans the phosphor screen with the brightness of the display being proportional to the frequency at which the data is illuminated. Thus, random noise in the data tends to disappear in the repetitive sweep of the electron beam. Accordingly, the oscilloscope presents a time average of data thus tending to smooth the display of the data.

However, oscilloscopes are expensive and do not have the flexibility of television monitors in displaying alpha numeric data. Further, a television monitor can be readily used with video tape and several television monitors can be driven in parallel. One limitation in the use of a television monitor lies in the display of noise in each sweep of electron beam with brightness equal to that of the A trace data. Any attempt to sample and display the signal more often results in a discontinuous display.

Accordingly, an object of the present invention is an improved method of controlling a television display whereby noise effects are minimized.

Another object of the invention is apparatus for generating raster scan control data for a television display using integrated digital data.

A feature of the invention is the use of summing means for integrating digital data point by point to produce raster line scan control data.

Briefly, in a television display system in which raster line illumination control is stored as digital data in a memory in response to the magnitude of video input signals, a method of reducing noise in the displayed image in accordance with the invention comprises the steps of generating first digital signals corresponding to the magnitude of a video signal at a plurality of time intervals, storing the digital signals in a memory at addresses defined by the time intervals, generating a second digital signal corresponding to magnitude of another video signal at a plurality of time intervals, combining each of the first digital signals with a corresponding second digital signal, and storing the combined value in a memory. The combined value stored in memory is then used for controlling the raster line scan of the television display. Preferably, the combined value is an average value of summed digital data.

In producing the combined digital value, a first memory receives and stores the digital signals corresponding to the magnitude of a video signal. Combining means is interconnected with the memory to receive and combine digital data from the memory along with digital signals corresponding to the magnitude of another video signal in time ordered sequence. The combined signals are then restored in the memory means for use in controlling the raster line scan.

Preferably, the combining means comprises an adder having a first and second input and an output, means for applying the digital signals corresponding to magnitude of a video signal to one input and means for applying stored data in time order sequence to the second input. The summed data at the output of the adder is then restored in the first memory. A second memory may be provided to periodically receive the data stored in the first memory, the second memory can be used for display control while the first memory captures data.

Alternatively, first and second memories can be interconnected with combining means whereby the first and second memory means alternately receive combined digital data from the combining means. Means selectively interconnects the outputs of the two memories with control circuitry for a television display whereby combined signals in one memory controls the television display while the other memory is receiving and combining data.

The invention and objects and features thereof will be more readily apparent from the following detailed description and appended claims when taken with the drawings, in which:

FIG. 1 is a functional block diagram of an ultrasonic scanning system including television displays.

FIG. 2 is a functional block diagram of one embodiment of apparatus in accordance with the invention.

FIG. 3 is a more detailed functional block diagram of the apparatus in FIG. 2.

FIGS. 4A-C show timing diagrams illustrating the operation of the apparatus of FIGS. 2 and 3.

FIG. 5 is a functional block diagram of an alternative embodiment of the invention.

FIG. 6 is a detailed schematic of the apparatus in FIGS. 2 and 3 as embodied in the Datason scanner system.

Referring now to the drawings, FIG. 1 is a functional block diagram of an ultrasonic scanner. In this embodiment the system includes a transducer 10 mounted on a hinged arm system shown generally at 12 whereby transducer 10 can move freely in a single plane. Potentiometers in scanhead 14 and associated with the arms of the system generate signals indicative of the X and Y position of the scanner 10 in the plane of motion.

Transducer 10 transmits ultrasonic signals (e.g. on the order of 2 megahertz) and generates electrical signals in response to reflections of the transmitted ultrasonic signals. The generated signals are attenuated in time due to attenuation of the ultrasonic signal in passing through a patient.

The attenuated video signal is then applied to a variable gain amplifier 16, and the amplified signal is then applied to analog to digital conversion and video processing circuitry 18. The output of circuitry 18 is then applied to A trace converter circuitry 20 and to scan converter and memory circuitry 22 which generate the signals for controlling television monitors 24 and 26, respectively.

The A trace converter generates a signal for real time display of the amplitude of each reflected ultrasonic wave. The A trace data applied to monitor 24 identifies a horizontal position on the monitor (e.g. 1,000 positions) and an amplitude or vertical position associated with each horizontal position. This data controls the intensity of the electron beam in the display during raster line scanning by the beam. Scale markings for the displayed A trace are generated by comb mark generator 28, and a time gain compensation curve is provided by generator 30.

A section view of the patient is displayed on monitor 26 in response to the scan converter and memory 22. The signal from circuitry 18 is converted for storage in a 512×512 memory matrix with each point in the matrix accommodating a 5 bit brightness code. The matrix corresponds to the pixels on the display of monitor 26 with the brightness code being indicative of the Grayscale for the pixels.

System control is provided by a central processing unit 34 which also controls a time base generator 36 which generates the timing signals for the system. A time gain compensation (TGC) control generator 38 generates the control signal for amplifier 16 and a control panel 40 is provided for manual control of the system through the central processing unit.

In a video A trace display system such as described in U.S. Pat. No. 4,172,386, supra, data for controlling the illumination of raster scan lines in the TV display is stored in a memory having a plurality of addresses corresponding to increments of the raster scan lines of the television display with the data indicating video signal magnitude at each increment. For example, each raster line may be defined by 1,000 addressable positions. The contents of the memory are read out during each raster line scan in the sequence in which they were stored with the data converted to an intensity modulated signal in a format compatible with the raster line scan of the video beam whereby a video display of the A trace is produced.

As described above, the stored digital data in the display memory represents not only the magnitude of a video signal at a plurality of time increments but also the magnitude of noise present in the video signal, and the noise component is displayed with equal brightness to the signal component. In accordance with the invention, the stored digital data for a video signal is combined or summed with time correlated digital data thereby reinforcing the true signal data while reducing the content of random noise. The resulting additions of digital data on a point by point basis for a plurality of video signals results in an integration of the digital signals with a resulting effect similar to the integration of signals by continuous scanning in an oscilloscope.

FIG. 2 is a block diagram of one embodiment of apparatus in accordance with the invention. Incoming digital data representing the amplitude of a video signal is applied to one input of adder 50. The output of the adder is connected to the input of a random access memory 52 which stores data at addresses corresponding to time increments of the video signal. The output of memory 52 is connected to a second input to adder 50 whereby data stored in memory 52 can be combined with the incoming data, and the combined data is then restored in memory 52. As disclosed in U.S. Pat. No. 4,172,386, the combined data stored in memory 52 can be applied to circuitry for controlling an electron beam in the illumination of raster lines in a television display.

In the embodiment of FIG. 2 the memory 52 functions as a capture memory for the combined data as well as a display memory for controlling the display. However, since the digital integration process can require a considerable period of time with respect to the display time, the use of a separate display memory for refreshing the television display is preferred. Periodically, the contents of a capture memory can be transferred to the display memory and the capture memory may be cleared for a repeat of the integration process.

FIG. 3 is another embodiment of the invention in which a display memory 54 is used in conjunction with a capture memory 56. In this embodiment capture memory 56 stores the integrated digital data from the adder 58 through latch 60, similar to memory 52 in FIG. 2. The integrated data is periodically loaded into the display memory 54, and capture memory 56 is cleared for another capture cycle. A capture address generator 62 provides addresses to the capture memory 56 during the integration and also provides addresses through multiplexer 64 to the display memory 54 for the writing of integrated data into the display memory 54. Since the reading of data from the display memory 54 for controlling the raster scans of a television display is at a higher frequency, a separate display address generator 66 is connected through multiplexer 64 to the display memory 54 for reading data from the display memory. A sequencer/controller 68 controls the writing and reading of data in both memories whereby data is captured in memory 56 while data is read from memory 54 and cleared when data is transferred to display memory 54.

FIGS. 4A-C are timing diagrams illustrating the operation of the circuitry of FIG. 3 in response to the sequencer/controller 68. Each frame of the display in a television monitor includes two interlaced fields with each field being scanned in one-sixtieth of a second. The beginning of each frame is indicated by a frame index pulse as illustrated in FIG. 4A. In an ultrasound scanning system a plurality of ultrasound pulses are launched during the display of each frame, and each ultrasound pulse is produced in response to a sync signal as illustrated in FIG. 4B. Video signals are generated in response to echos of each of the ultrasound pulses with digital data representing magnitude of the video signal formed in response to each of the ultrasound pulses. At the beginning of each frame cycle, data is transferred from the capture memory 56 to the display memory 54 in time period 1 of FIG. 4C, and the capture memory is then cleared in time period 2. The capture and integration of data then commences and continues during time period 3 until the end of the frame is approached. During time period 4 at the end of the frame, the capture memory 56 becomes idle and waits for a subsequent transfer of data to the display memory 54. The display memory continually refreshes the display (during the time period 5) except for the small time period 1 at the beginning of a frame when data is transferred from the capture memory.

FIG. 5 is a functional block diagram of another embodiment of the invention in which two memories function alternatively as the capture memory and the display. In this embodiment the output of adder 80 is connected to the input of the first memory 82 and to the input of the second memory 84 whereby data can be captured in either of the two memories. The outputs of the two memories are connected to an input of adder 80 and to the output circuitry for the television display through multiplexer 86. Each memory has its own address generator 83 and 85, respectively, and the timing for the capture mode of operation and this display refresh mode of operation is provided through multiplexer 88 to the address generators 83, 85. Thus, when memory 82, for example, is interconnected through multiplexer 86 with adder 80 for the capture of integrated data, memory 84 functions as a refresh memory for the display. After a period of time memory 84 is cleared and interconnected with the adder 80 through multiplexer 86 for the capture of data. During this time period the data in memory 82 is used for refreshing the television display. The multiplexer 88 responds to a sequencer 90 which periodically alters the functions of memories 82, 84.

FIG. 6 is a detailed schematic of the circuitry of FIG. 3 as embodied in the Datason system. Like elements in the Figures have the same reference numerals, and the commercially available devices are indicated in parentheses. Operation is the same as described above for FIG. 3. The incoming data is connected to inputs of adder 58 (three National S283), and the output of adder 58 is connected to the latch 60 (two National S373). Latch 60 is connected to capture memory 56 (ten Intel 2125) and to the Data Out lines. The output lines of capture memory 56 are connected to the inputs to adder 58. While not required for the present invention, the outputs from capture memory 56 can be applied through latch 91 and multiplexer 92 to the input of adder 58.

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. In a television display system in which video magnitude data is stored as digital data in a memory for control of the television display, apparatus for reducing noise in a displayed image comprising means for generating first digital signals corresponding to magnitude of a video signal at a plurality of time intervals, first memory means for storing said digital signals at addresses defined by said time intervals, means for combining digital signals corresponding to magnitude of another video signal with corresponding digital signals stored in said first memory means, a second memory means, means for storing said combined values in said second memory means, means for controlling said first memory means and said second memory means whereby said first memory means and said second memory means alternately receive combined digital data, and means interconnecting said firstmemory means and said second memory means with a television display whereby said combined digital data in said first memory means and in said second memory means alternately control said television display.

* * * * *